Feb. 19, 1924.
J. O. ALLSTOTT
HAYSTACKER
Filed Sept. 26, 1922    2 Sheets-Sheet 2
1,484,457
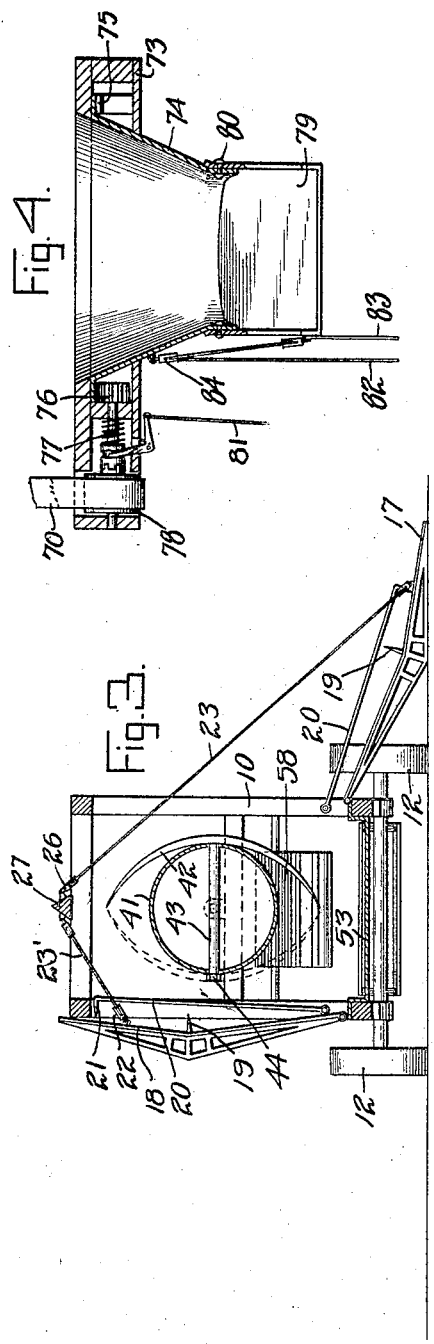
Inventor
James O. Allstott
By
Attorney Patented Feb. 19, 1924.

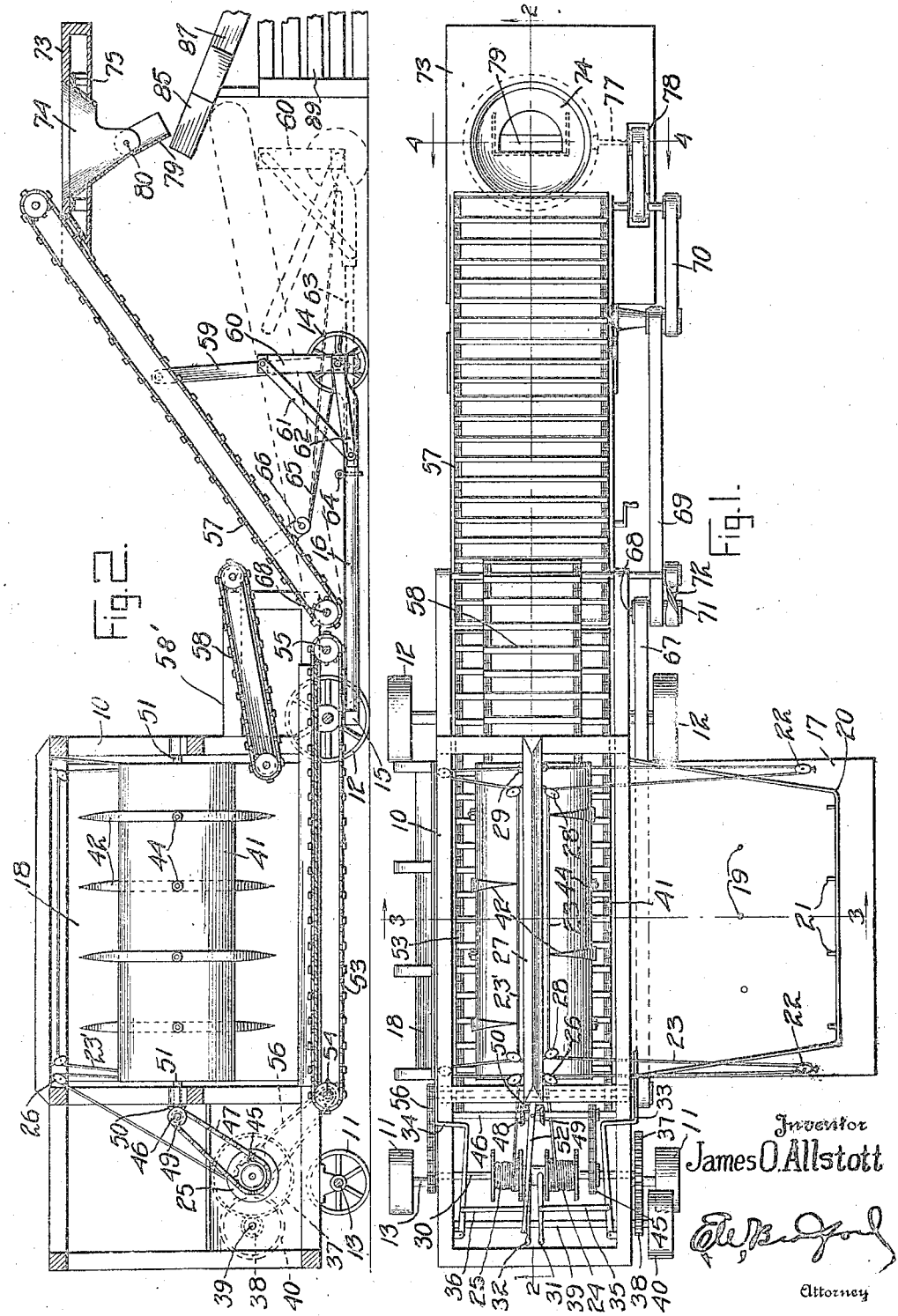

1,484,457

UNITED STATES PATENT OFFICE.

JAMES O. ALLSTOTT, OF PAULS VALLEY, OKLAHOMA.

HAYSTACKER.

Application filed September 26, 1922. Serial No. 590,700.

*To all whom it may concern:*

Be it known that I, JAMES O. ALLSTOTT, a citizen of the United States, residing at Pauls Valley, in the county of Garvin and State of Oklahoma, have invented certain new and useful Improvements in Haystackers, of which the following is a specification.

My said invention relates to a hay stacker and it is an object of the invention to provide a device of this character which shall be arranged to receive the hay directly from the field and build up a stack of any preferred size and shape to protect the hay against the weather.

Another object of the invention is to provide a device of this character which may feed the hay directly to a press.

Still another object is to provide a machine which can readily be transported from one place to another.

Another object is to effect economy of labor, as with my device two men can do the work of stacking about ten tons of hay per hour, and can make a better and more uniform stack than the average handmade one.

Referring to the accompanying drawings which are made a part hereof and on which similar reference characters indicate similar parts, Figure 1 is a plan of my machine, Figure 2 a section on line 2—2 of Figure 1, Figure 3 a transverse section on line 3—3 of Figure 1, Figure 4 a transverse section on line 4—4 of Figure 1, and Figure 5 shows the device arranged to feed a pair of baling presses.

In the drawings reference character 10 indicates the main frame of the device, this frame constituting a truck having front wheels 11 and rear wheels 12. The front wheels are mounted on an axle 13 pivotally connected to a bolster on the frame 10 to permit the front wagon to turn. A pair of wheels 14 are mounted on an axle forming a rear truck which is pivotally connected at 15 to the rear axle of the front wagon by means of a telescoping connection 16. The rear truck supports a conveyor and a stacking device, the conveyor being located to receive hay from a conveyor on the front truck.

The front truck supports, by means of the frame 10, a pair of folding receiving devices or aprons 17 and 18 adapted to lie on the ground as shown at the front of Figure 1 and at the right in Figure 3, or to be raised into the position shown at the rear of Figure 1 and at the right in Figure 3. The aprons are adapted to receive hay from a buck rake, the draft animals passing one on each side of an apron and the rake sliding over the same. The rake is then backed off and the hay is left on the apron. A set of pins or teeth 19 on each apron acts to hold the hay in place and prevent its withdrawal by the rake as it is backed off. It will be understood that grain may be similarly placed on the aprons by a header barge or bundles of grain or fodder may be carried to it by any convenient means. A U-shaped holding device 20 pivoted to the side of the frame 10 above the apron is adapted to be lowered into holding position relative to the material on the same. The holding device has teeth 21 adapted to penetrate the hay or other material and these teeth cooperate with teeth 19 to hinder removal of the hay.

For raising the aprons into the vertical position each of them is provided with a pair of pulleys 22 adjacent its free end. In a preferred arrangement of the device a cable 23 is adapted to be wound on a drum 24, the cable passing from the drum to a pulley 26 on a fixed member of the frame, here shown as a longitudinal bar 27 forming one of the top bars of the frame. From the pulley 26 the cable passes to a pulley 22 on the receiving device 17, then in succession to a pair of pulleys 28 and 28' on the bar 27, then to another pulley 22 on the receiving device 17 and then to an attaching device at 29 on the bar 27 or on some other fixed part of the frame. The cable 23' for the left-hand apron is similarly arranged and is wound at one end on a drum 25. The drums 24 and 25 are loosely mounted on a shaft 30 and are adapted to be clutched thereto respectively by means of a pair of clutch levers 31 and 32. Adjacent to the clutch levers I provide a pair of pivoted levers 33 and 34 connected to the clutch levers by links 35 and 36. The levers 33 and 34 project at their free ends into the path of movement of the receiving devices 17 and 18 and provide automatic means for unclutching the respective drums from the driving shaft when the receiving devices are raised to their full extent. Each of the clutch levers is adapted and intended to be thrown out by hand when the receiving device is high enough but this automatic means prevents injury to the machine should the operator for any reason fail to disconnect the clutch at the proper time. The manual control is essential for the reason that the hay or other material will often be in a dense, thick mass preventing the apron from being raised to its full extent and interfering with the operation of other parts, hence the elevating movement should be stopped one or more times before the limit is reached.

The shaft 30 carries a gear 37 driven by a pinion 38 on a shaft 39 which carries a pulley 40 driven by a belt operated in any convenient manner as by a steam or gasoline engine.

For removing the hay from the elevated aprons I provide a revolving cylinder 41 having a plurality of horns 42. Each of these horns is made in the form of an anchor having a shaft 43 extending through the cylinder and secured by a nut 44 or equivalent means and the shaft supports a pair of oppositely extending horns spreading gradually away from the cylinder whereby one of each pair of the said horns is adapted to engage the hay on the adjacent apron and pull it away when the cylinder is revolved in one direction and the other of each pair is adapted to engage the hay on the other apron when the cylinder is revolved in the opposite direction. It will be seen that the immediate removal of all of the hay is to some extent prevented by the U-shaped holding device 20 and by teeth 19 and 21. Furthermore the aprons are not lifted to their full extent when they are heavily loaded or if the material is such as should be thoroughly pulled apart or is too heavy to be handled rapidly, as for example in handling green corn fodder or wet grass.

For driving the cylinder I provide a sprocket 45 on the shaft 30 adapted to drive a sprocket on a parallel shaft 46 by means of a chain 47. The shaft 46 has a slidable sleeve of conventional type splined thereto and bearing at its ends a pair of beveled gears 48 and 49 adapted to engage selectively with a beveled gear 50 fixed to the shaft 51 of the cylinder. A shifting lever 52 serves to slide the sleeve and shift the gears to drive the cylinder in one direction or the other. In emergencies I may take hay or the like from both receiving devices 17 and 18 at the same time, the cylinder revolving in either direction for this purpose. The capacity of the cylinder to rotate in either direction is also useful in case the material hangs on the horns when the cylinder may be made to rotate reversely, thus causing the adhering material to be pulled off the horns. One man should operate the levers 31, 32 and 52 and in general take care of the machine, excepting those parts controlled by the man on the stack.

Underneath the cylinder 41 is a belt conveyor 53 supported and driven by a pair of shafts 54 and 55. The forward one of said shafts is driven from the shaft 30 by means of a sprocket chain 56. The conveyor belt revolves in a direction to carry the material deposited thereon by the cylinder toward the rear of the machine and the material passes from this conveyor belt to an elevating conveyor 57 mounted on a rigid frame pivoted to the front wagon. A short auxiliary conveyor 58 is located adjacent the point of transfer to hold down the material and insure its proper passage from one leg of the main conveyor to the other, this conveyor being mounted on a frame 58' pivoted at its rear end. This is especially important if the hay is very light and grizzly. This auxiliary conveyor also helps to pull the hay off from conveyor belt 53 and pushes it along on conveyor belt 57. The elevating conveyor is supported on the rear truck by means of a pair of bars 59 pivotally connected to the sides of the pivoted supporting frame and to the axle of the truck. The truck also comprises a bolster 60, braces 61 for the same extending diagonally upward and horizontal braces 62 connected at their ends to the axle of the truck. Each brace at its forward end is attached to one of the telescoping elements of the connecting link 16 between the trucks.

The connecting link is formed of two or more telescoping parts, the smallest part being indicated at 63, and the parts are held together in working position as indicated in full lines in Figure 2 by a pin 64 passing through registering openings in each of them. When the device is to be moved to a distance the truck 14 which normally is held in the position shown in full lines by means of a cable 65 wound on a drum on the shaft 66 is permitted to recede to the dotted line position by unwinding of the cable whereupon the parts assume the positions indicated in dotted lines in Figure 2, the elevating conveyor resting near its rear end on the bolster 60. When the device is again to be placed in operation a crank on shaft 66 is operated to wind the cable 65 on the drum on shaft 66 thereby causing the bar 59, due to its pivotal connections, to raise the conveyor support into the position shown in full lines. At the same time the link 16 is telescoped and the pin 64 inserted to hold it so. When the device is to be moved only a short distance, as for starting a new stack adjacent to one just completed, I may hook a tractor to the front end of the machine and pull it along without lowering the conveyor frame and stacker. After moving the machine, the conveyor may be lowered part way to place the controlling devices for the stacker in reach of the man on the stack, or in windy weather to prevent blowing about of the hay. A wind sheet may, of course, be used if preferred and this may be a sheet fastened to the stacker with ropes and staked to the ground to steady it.

For driving the elevating conveyor and the upper conveyor 58 I have provided connections comprising a belt 67 running over a pulley on shaft 54 and another pulley on the shaft 68 at the lower end of the frame of the elevating conveyor. This shaft, as will be seen in Figures 1 and 2, carries sprockets engaging with the sprocket chains at the sides of the conveyor belt and also has an intermediate pulley for driving a belt 69 which in turn drives a belt 70, the purpose of which is hereinafter explained. The shaft 68 also carries an outer pulley 71 which by means of the twisted belt 72 drives the auxiliary conveyor belt 58 in the opposite direction from the other conveyor belts whereby its lower run will move in the same direction as the upper runs of the belts 53 and 57.

The conveyor supporting means at its outer end carries a support 73 for the stacker proper. This stacker consists of a funnel 74 adapted to rotate on its axis, the funnel having a radially extending flange for supporting it on the frame 73. At its under side the flange has gear teeth at 75 engaging with a pinion 76. This pinion is carried by a shaft 77 adapted to be clutched to a pulley 78 driven by the belt 70. The clutch is normally held in by a spring and I have provided a rope 81 for disconnecting the same. At the lower end of the funnel is a spout or chute 79 pivoted at 80. A pair of ropes 82 and 83 are connected to the chute, the rope 82 passing over a pulley 84 pivotally secured to the side of the funnel. By means of the ropes it will be seen that the man on the stack can vary the inclination of the chute which may be held at the desired inclination by friction of the parts or if this is found insufficient I may provide any conventional form of latch or brake for holding it in adjusted position. It will be seen that by gradually moving the chute first in one direction and then in the other a circular stack will be formed consisting of layers of material wound in spirals first outwardly to the edge of the stack and then inwardly toward the center. The contour of the stack may be changed to produce a bulge, if desired, and also to draw in the stack at the top in any conventional or preferred form. For filling in the middle of the stack or for topping out or for filling low places when the stack is built on sideling ground I have provided the clutch on shaft 77. By throwing out the clutch the rotation of the funnel will be stopped and the hay will all be delivered at the desired spot. In place of the clutch I may provide a pulley to which the belt may be shifted or any other conventional power disconnecting means.

In the arrangement illustrated in Figure 5 I have adapted my device to feed a pair of baling presses. I may either use the entire machine as illustrated in the foregoing figures and position the chute 79 to feed directly into the upper end 85 of the chute leading to the baling press or I may provide a special short conveyor at the rear end of the conveyor 53 for carrying the hay to the press. In either case I preferably use a chute comprising the upper end 85 having a single passage and the lower end having a pair of branch passages 86 and 87 leading respectively to presses indicated conventionally at 88 and 89. A swinging gate 90 is located in position to close either one of the branch passages and may be operated in any conventional or preferred manner.

It will be obvious to those skilled in the art that many modifications of my device may be made without departing from the spirit of the invention, the true scope of which is indicated in the appended claims. For this reason I do not limit myself to the precise embodiment of the invention shown in the drawings and described in the specification but only as indicated by said claims.

Having thus fully described my said invention, what I claim as new and desire to secure by Letters Patent, is:

1. A hay stacker comprising means for receiving and elevating a mass of hay or like material, means for disintegrating the mass and feeding it to a conveyor at a substantially uniform rate, elevating means for the material, means for receiving material from said elevating means, and manually controlled means for receiving material from said elevating means and distributing it on the stack, substantially as set forth.

2. A hay stacker comprising a pivoted apron to receive hay or the like, means for raising said apron, means for progressively removing the material from the raised apron and feeding it to an elevating conveyor, and means for receiving it from said elevating means and distributing it to form a stack, substantially as set forth.

3. A hay stacker comprising a pivoted apron adapted to receive hay or like material from a buck rake or the like, means on said apron to retain the material thereon, and means for removing the material progressively from the apron and distributing it to form a stack, substantially as set forth.

4. A stacker comprising a pivoted apron adapted to assume a recumbent position for receiving a load and having means thereon for holding the material, means adapted to rest on the material on the apron and co-operate with said first-named means to retain the material on the apron, means for raising the apron, and means for removing the material incrementally from the apron, substantially as set forth.

5. A hay stacker comprising a pivoted apron for receiving material from a buck rake or the like, means for elevating the apron, a rotary cylinder having teeth for removing the material from the apron at a substantially uniform rate, and feeding it to a conveyor and means for distributing the material so fed to form a stack, substantially as set forth.

6. In a hay stacker, a pair of aprons for receiving material from a buck rake or the like, means for elevating said aprons, a rotary device mounted between said aprons and adapted to remove material from them at a substantially uniform rate in their elevated position, and means for receiving material from the rotary device and forming it into a stack, substantially as set forth.

7. A stacker comprising a pair of pivoted aprons for receiving material from a buck rake or the like, means for progressively removing material from the aprons when elevated, and means for elevating the aprons comprising individual cables connected to the respective aprons and selective means for winding up said cables, substantially as set forth.

8. A stacker comprising a pair of pivoted aprons for receiving material from a buck rake or the like, means for progressively removing material from the aprons when elevated and means for elevating the aprons comprising individual cables connected to the respective aprons, drums for winding said cables, and manually controlled power mechanism for selectively actuating said drums, substantially as set forth.

9. A stacker comprising a pair of pivoted aprons for receiving material from a buck rake or the like, means for progressively removing material from the aprons when elevated and means for elevating the aprons comprising individual cables connected to the respective aprons, drums for winding said cables, manually controlled power mechanism for selectively actuating said drums, and automatic means for disconnecting the power when the aprons are fully elevated, substantially as set forth.

10. A stacker comprising a pair of pivoted aprons for receiving material from a buck rake or the like, means for progressively removing material from the aprons when elevated, means for elevating the aprons comprising individual cables connected to the respective aprons, drums for winding said cables, power means for driving the drums, and automatic means for disconnecting the driving means when the aprons are fully elevated, substantially as set forth.

11. A stacker comprising a frame, pivoted aprons at opposite sides of the frame adapted to receive material from a buck rake or the like, a toothed member between the aprons for removing material from either or both of them, and means for rotating said cylinder in either direction, substantially as set forth.

12. A stacker comprising a frame, pivoted aprons at opposite sides of the frame adapted to receive material from a buck rake or the like, and means between the aprons for removing material from them when in raised position, substantially as set forth.

13. A stacker comprising a frame, pivoted aprons at opposite sides of the frame adapted to receive material from a buck rake or the like, a cylinder between the aprons for removing material from either or both of them, means for rotating said cylinder in either direction and projections on said cylinder adapted to engage the material on the aprons and withdraw it therefrom, substantially as set forth.

14. A stacker comprising a frame, pivoted aprons at opposite sides of the frame adapted to receive material from a buck rake or the like, a cylinder between the aprons for removing material from either or both of them, means for rotating said cylinder in either direction, and oppositely pointed members attached to the cylinder intermediate their ends the opposite points spaced from the periphery of the cylinder and adapted to engage material on the aprons and remove it therefrom, substantially as set forth.

15. A stacker comprising a frame, pivoted aprons at opposite sides of the frame adapted to receive material from a buck rake or the like, a cylinder between the aprons for removing material from either or both of them, means for rotating said cylinder in either direction, anchor-shaped devices on the cylinder having shafts extending into the cylinder and secured thereto, and oppositely projecting horns extending transversely of the cylinder and having their points spaced from the periphery thereof, substantially as set forth.

16. A hay stacker comprising means for distributing material to form a stack, elevating means for feeding material to said distributing means, means for feeding material at a substantially uniform rate to such elevating means, and means adapted to lie flat on the ground to receive material from a buck rake or the like and adapted to be moved to position such material for engagement by the feeding means, substantially as set forth.

17. A stacker comprising elevating means, a funnel to receive material from said elevating means, means for rotating the funnel and a pivoted chute at the lower end of the funnel to vary the angle of delivery of material, substantially as set forth.

18. A stacker comprising elevating means, a rotary funnel to receive material therefrom, and an adjustable chute at the lower end of the funnel whereby material may be distributed along various paths, substantially as set forth.

19. A stacker comprising elevating means, a funnel to receive material therefrom, means for rotating the funnel, an adjustable chute at the lower end of the funnel adapted to distribute material along various paths, and means to intermit the rotation of the funnel, substantially as set forth.

20. A stacker comprising elevating means, a funnel for receiving material from said elevating means, means for rotating the funnel, an adjustable chute at the lower end of the funnel and means within reach of a man on the stack for adjusting the angle of the chute relative to the funnel, substantially as set forth.

21. A stacker comprising elevating means, a rotary funnel for receiving material from said elevating means, an adjustable chute at the lower end of the funnel, and means within reach of a man on the stack for adjusting the angle of the chute relative to the funnel and for intermitting rotation of the funnel, substantially as set forth.

22. In a stacker of the character described, material elevating means, means for feeding material at a substantially uniform rate to said elevating means, a funnel for receiving material from said elevating means, a chute on said funnel and a branched chute adapted to receive material from said first-named chute and feed it to any one of a plurality of baling presses, substantially as set forth.

23. A stacker of the character described comprising a main truck, a rear truck, an elevating conveyor supported at one end by said rear truck, means on said main truck for feeding material to the other end of the conveyor, and means on the rear truck for supporting the conveyor in lowered position for transportation, substantially as set forth.

24. A stacker of the character described comprising a main truck, a rear truck, an elevating conveyor supported by said rear truck, means on said main truck for feeding material to the other end of the conveyor, means on the rear truck for supporting the conveyor in lowered position for transportation, and means for raising and lowering the conveyor, substantially as set forth.

25. A stacker of the character described comprising a front truck, a rear truck, a support on the rear truck for an elevating conveyor, a stacker also carried by said support, means on the front truck for feeding material to the elevating conveyor to be stacked, means for raising and lowering the conveyor support and the stacker, and means on the rear truck for supporting the conveyor in lowered position, substantially as set forth.

26. In a stacker of the character described, a front truck having a rear axle, a rear truck having an axle, an elevating conveyor supported at one end by the rear truck, a telescoping coupling between said axles and connections between the rear truck and the elevating conveyor whereby the conveyor is elevated when said coupling is telescoped and is lowered for transportation when the coupling is in extended relation, substantially as set forth.

27. In a stacker of the character described, a front truck having a rear axle, a rear truck having an axle, an elevating conveyor supported by the rear truck, a telescoping coupling between said axles, connections between the rear truck and the elevating conveyor whereby the conveyor is elevated when said coupling is telescoped and is lowered for transportation when the coupling is in extended relation, registering apertures in the telescoping sections, and a pin adapted to hold them in telescoped relation, substantially as set forth.

28. A stacker of the character described comprising a conveyor, means for feeding hay or like material thereto, an elevating conveyor receiving material from the first conveyor, and superposed means at the point of transfer for holding the material down on the conveyors, substantially as set forth.

29. A stacker of the character described comprising a conveyor, means for feeding hay or like material thereto, an elevating conveyer receiving material from the first conveyor, and a traveling belt at the point of transfer for holding the material down on the conveyors, substantially as set forth.

30. A stacker of the character described comprising a belt conveyor, means for feeding hay or like material thereto, an elevating belt conveyor receiving material from the first conveyor, a superposed traveling belt for holding the material down at the point of transfer, and means for driving the adjacent runs of all the belts in the same direction, substantially as set forth.

In witness whereof, I have hereunto set my hand and seal at Pauls Valley, Oklahoma, this 22nd day of September, A. D. nineteen hundred and twenty-two.

JAMES O. ALLSTOTT. [L. S.]

Witnesses:
 ALBERT BROWN,
 MONROE O'HEARN.